United States Patent
Wu et al.

(10) Patent No.: US 8,320,236 B2
(45) Date of Patent: Nov. 27, 2012

(54) METHOD FOR PROCESSING ETHERNET RING MESSAGE AND AN ETHERNET RING PROTECTION SYSTEM USING THE METHOD

(75) Inventors: Shaoyong Wu, Shenzhen (CN); Zhichun Wang, Shenzhen (CN); Shihao Guo, Shenzhen (CN)

(73) Assignee: ZTE Corporation (CN)

( * ) Notice: Subject to any disclaimer, the term of this patent is extended or adjusted under 35 U.S.C. 154(b) by 329 days.

(21) Appl. No.: 12/665,702

(22) PCT Filed: Dec. 18, 2007

(86) PCT No.: PCT/CN2007/003647
§ 371 (c)(1),
(2), (4) Date: Dec. 18, 2009

(87) PCT Pub. No.: WO2008/154781
PCT Pub. Date: Dec. 24, 2008

(65) Prior Publication Data
US 2010/0188968 A1    Jul. 29, 2010

(30) Foreign Application Priority Data
Jun. 19, 2007    (CN) .......................... 2007 1 0111528

(51) Int. Cl.
*G08C 15/00* (2006.01)
(52) U.S. Cl. ........................................ 370/217; 370/221
(58) Field of Classification Search .......... 370/216–218, 370/221–224
See application file for complete search history.

(56) References Cited

U.S. PATENT DOCUMENTS

| | | | | |
|---|---|---|---|---|
| 6,831,893 B1 * | 12/2004 | Ben Nun et al. | ............... | 370/235 |
| 7,355,965 B2 * | 4/2008 | Griswold et al. | ............... | 370/216 |
| 7,506,063 B2 * | 3/2009 | Berg | ............... | 709/238 |
| 7,876,673 B2 * | 1/2011 | Ram et al. | ............... | 370/222 |
| 8,085,676 B2 * | 12/2011 | Skalecki et al. | ............... | 370/222 |
| 2002/0120761 A1 * | 8/2002 | Berg | ............... | 709/230 |
| 2003/0225907 A1 * | 12/2003 | Krishnan | ............... | 709/238 |
| 2005/0220096 A1 * | 10/2005 | Friskney et al. | ............... | 370/389 |
| 2006/0245351 A1 * | 11/2006 | Pande et al. | ............... | 370/216 |
| 2007/0291752 A1 * | 12/2007 | Ben-Dvora et al. | ............... | 370/389 |
| 2008/0239943 A1 * | 10/2008 | Hauenstein et al. | ............... | 370/216 |

FOREIGN PATENT DOCUMENTS

| | | |
|---|---|---|
| CN | 1691796 A | 11/2005 |
| CN | 1972234 A | 5/2007 |

OTHER PUBLICATIONS

International Search Report Dated Mar. 13, 2008, Application No. PCT/CN2007003647, 2 Pages.

* cited by examiner

*Primary Examiner* — Kerri Rose
(74) *Attorney, Agent, or Firm* — Brooks Kushman P.C.

(57) ABSTRACT

A method for processing Ethernet ring messages and a corresponding Ethernet ring protection system are provided. The method comprises distinguishing a message to be processed by processors of transit nodes from that not to be processed by the processors of the transit nodes, and setting a distinguishing identifier when constituting a message; after receiving the message, the transit node forwarding the message not to be processed by the processor thereof to other nodes, or sending the message to be processed by the processor of the transit node to other nodes and meanwhile reporting the message to its processor depending on the distinguishing identifier; the system comprises a master node and transit nodes which generates messages with the distinguishing identifier and performs different process for these messages according to the distinguishing identifier.

12 Claims, 2 Drawing Sheets

METHOD FOR PROCESSING ETHERNET RING MESSAGE AND AN ETHERNET RING PROTECTION SYSTEM USING THE METHOD

CROSS REFERENCE TO RELATED APPLICATIONS

The present application is the U.S. National Phase of International Patent Application Serial No. PCT/CN2007/003647, filed on Dec. 18, 2007, which claims the benefit of Chinese Patent Application Serial No. 200710111528.6, filed on Jun. 19, 2007, both of which are hereby incorporated by reference in their entireties.

TECHNICAL FIELD

The present invention relates to the Ethernet ring automatic protection technical field, and more specifically, to a method for processing control messages effectively in the Ethernet ring automatic protection system and a system using the method.

BACKGROUND OF THE RELATED ART

The Ethernet ring system is a ring consisting of several nodes connecting with one and another, and several domains, that is, the Ethernet ring protection domains may be defined on the ring. One domain comprises one master node and several transit nodes and a group of protected service Virtual Local Area Networks (VLAN) which are used to forward the services of the user data and a control VLAN which is used to forward the protocol messages, wherein, the two ports of the master node on the ring are defined as the primary port and the secondary port respectively, and the service VLAN which is protected is defined as the protected service VLAN. When the link works well, the master node disables the secondary port's capability of forwarding protected service VLAN, and there is no loop formed in the network, avoiding the "broadcasting storm" due to the loop; when the link fails, the secondary port's capability of forwarding the protected service VLAN is enabled so that the user data can pass through the secondary port of the master node to guarantee the connectivity of the service.

FIG. 1 is a topological graph of the Ethernet ring automatic protection system which consists of node S1, S2, S3 and S4, and an Ethernet ring protection domain is configured on the ring consisting of these four nodes, the master node in the domain is S2, and the rest are the transit nodes. The two ports of S2 on the ring are the primary port and the secondary port respectively, wherein port 2 is the primary port (P), and port 1 is the secondary port (S). In addition, the control VLAN and the protected service VLAN are defined in the domain, with each port on the ring configured in the control VLAN and the protected service VLAN. When the link on the ring works well, the master mode S2 disables the secondary port 1's capability of forwarding the protected service VLAN data to avoid forming loop path in the network which may result in the "network storm"; when the link fails, the master node S2 enables the secondary port 1's capability of forwarding the protected service VLAN data to make the data in the service VLAN be re-connected.

The control messages in the Ethernet ring automatic protection system mainly comprises the health detection message of HELLO, the link failure alarm message of LINK-DOWN, a link failure notification message of FLUSH-DOWN, and a link recovery notification message of FLUSH-UP. The communication and decision making among the nodes in the Ethernet ring protection system are performed by these messages.

In one domain, the master node sends the health detection message of HELLO out periodically through the primary port, and the HELLO message is transmitted in the control VLAN of the domain, and when the link on the ring works well, the HELLO message arrives at the secondary port of the master node through the transit nodes one by one. When the master node receives the HELLO message from the secondary port, it considers that the link works well; and when the master node does not receive the HELLO message in the due time, it considers that the link fails.

When a transit node detects that the status of the port associated with the directly connected link on the ring changes from working well to failure, it sends the LINK-DOWN message to the master node which acquires that the link on the ring fails after receiving the message.

When the master node finds out that the HELLO message is expired or receives the LINK-DOWN message, it considers that the link on the ring fails, then enables the secondary port's capability of forwarding the protected service VLAN and sends the FLUSH-DOWN message to notify the other nodes that the link on the ring fails and they should update the Media Access Control (MAC) address table of the ports of the nodes on the ring.

After a transit node receives the FLUSH-DOWN message, it acquires that the link on the ring fails and then updates the MAC address table of its ports on the ring.

When the link fails, the master node still sends the HELLO message out periodically from the primary port, and if the master node receives the HELLO message from the secondary port, it considers that the link is recovered and then disables the capability of forwarding protected service VLAN of the secondary port, and sends the FLUSH-UP message to the transit nodes to notify them that the link is recovered.

After a transit node receives the FLUSH-UP message, it acquires that the failure of the link on the ring has been resolved and then updates the MAC address table of its ports on the ring.

In the Ethernet ring automatic protection system, the transmission of the HELLO message on the ring is the most frequent. In order to shorten the convergence duration of the link switch in the Ethernet ring automatic protection system, the transmission period of the HELLO message is usually set to be relatively small, some times smaller than one second, and accordingly the transmission frequency of the HELLO message is relatively high. In addition, when there are multiple Ethernet protection domains on the same physical ring, each domain will send out its own HELLO message. Therefore, each node on the ring will receive a lot of HELLO messages. However, among the nodes of the Ethernet ring automatic protection system, only the master node's processor is required to process the HELLO message while the transit nodes just need to transmit the HELLO message rather than process it with their processors, therefore, when the processors of the transit nodes receive the HELLO message periodically, the processing by the processor is invalid. In the control messages of the Ethernet ring automatic protection system, only the FLUSH-DOWN and FLUSH-UP message need to be processed by the processors of the transit nodes, and when other messages are sent to deteriorate the reliability of the system and greatly waste the system resource of the transit nodes.

SUMMARY OF THE INVENTION

In order to overcome the defects and shortcomings of the prior art, the present invention offers a method for processing Ethernet ring control messages and an Ethernet ring protection system using this method to effectively avoid the waste of system resource.

In order to achieve the first object, the method for processing Ethernet ring control messages provided in the present invention comprises the following steps of:

1.1) distinguishing a message to be processed by processors of transit nodes from a message not to be processed by the processors of the transit nodes and setting a distinguishing ID in the message when a master node or the transit nodes constitute the message to be sent; wherein, the message to be processed by the processors—of the transit nodes is one needs to be processed by the processors—of the transit nodes, while the message not to be processed by the processors of the transit nodes is one does not need to be processed by the processors of the transit nodes;

1.2) after receiving said message at one port, the transit node preparing to forward the message not to be processed by the processor of the transit node through other ports or preparing to forward the message to be processed by the processor of the transit node through other ports and meanwhile to report the message to the processor thereof depending on the distinguishing ID of the message; Wherein the forward means forward to other nodes, in which the message might be discarded when the out-port is blocked.

Furthermore, said processor is a Central Processing Unit (CPU), a network processor, or a field programmable gate array.

Furthermore, said distinguishing ID comprises but does not limit to a destination MAC address of the message, a ULAN number of a frame or an encode at a fixed position in the message.

Furthermore, if the destination MAC address of said message received by the transit node at one port is 0x0180c2000035, said transit node sends the message to other nodes at the other port; if the destination MAC address of said message received by the transit node at one port is 0x00e02b000004, said transit node reports this message to its own processor and sends it to other nodes at the other port.

Furthermore, in step 1.1), the master node sets the destination MAC address of a link failure notification message and a link recovery notification message as 0x00e02b000004.

Furthermore, the method further comprises: after said master node receives any one of the messages, it reports the message to its processor for processing.

In order to achieve the other object, an Ethernet ring automatic protection system provided in the present invention comprises a master node and transit nodes on a ring, wherein:

Said master node is used to send a health detection message regularly, determine link status according to the return status of the health detection message and a link failure alarm message from the transit nodes, and notify the transit node of the link status, said health detection message carrying a distinguishing ID to be used to determine whether the message needs to be processed by the transit nodes;

Said transit node is used to send the link failure alarm message to the master node, receive the health detection message from the master node, perform one of the following processes for the message according to the distinguishing ID carried in the health detection message: send said message to other nodes at the other port, report said message to a processor of the transit node and send the message to other nodes at the other port, and determine whether to update a MAC address table thereof on the ring after receiving a notification about the link status from the master node.

Furthermore, the processor is a Central Processing Unit (CPU), a network processor, or a field programmable gate array.

Furthermore, said distinguishing ID comprises but does not limit to any one of the followings: a destination MAC address of the message, a VLAN number of a frame or a code at a fixed position in the message.

Furthermore, if the destination MAC address of said message received by the transit node at one port is 0x0180c2000035, said transit node sends the message to other nodes at the other port; if the destination MAC address of said message received by the transit node is 0x00e02b000004, said transit node reports this message to its own processor and sends the message to other nodes at the other port.

Furthermore, the master node sets the destination MAC address of the link failure notification message and the link recovery notification message as 0x00e02b000004.

Furthermore, after said master node receives said health detection message and a link failure alarm message, it reports them to its processor for processing.

The method for processing the Ethernet ring control messages and the Ethernet ring protection system provided in the present invention sort the Ethernet ring control messages, define different destination MAC addresses for different types of control messages, sort the methods for processing the messages with different MAC addresses, and define the characteristic of each category, so that the processor of each node in the Ethernet ring only receives the messages need to be processed, avoiding that the processor of the node in the Ethernet ring receives a lot of unnecessary messages, speeding up the responding speed of the Ethernet ring control message, improving the capability against link failure of the Ethernet ring in the practical network deployment, and largely reducing the waste of system resource.

EMBODIMENTS OF THE INVENTION

In the present invention, the Ethernet ring control messages are classified into two categories: the messages to be processed by the transit nodes' processor and messages not to be processed by transit node's processor, wherein, the processor may be a Central Processing Unit (CPU), a network processor, or a field programmable gate array.

In this embodiment, the destination MAC address of the messages to be processed by the transmission nodes' processor is set as 0x00e02b000004, and that of messages not to be processed by transit node's processor is set as 0x0180c2000035. 0x0180c2000035 is self-defined, while 0x00e02b000004 is associated with rfc3619. The FLUSH-DOWN and FLUSH-UP are the messages to be processed by the transit nodes' processor, while HELLO and LINK-DOWN are messages not to be processed by transit node's processor.

In addition, there are three ways for the nodes to transmit the Ethernet ring control messages, which are sending to the processor, directional transmitting, sending to the processor and directional transmitting. When a node receives a message which matches the characteristic of sending to the processor, it sends the message to its processor to process and does not send the message out through other ports; when the node receives a message which matches the characteristic of directional transmitting, it sends the message through the out-port of the directional transmission and does not send the message to its processor; when the node receives a message which matches the characteristic of sending to the processor and directional transmitting, it sends the message out through the out-port of the directional transmission as well as sends the message to its processor to process.

Figure 1:
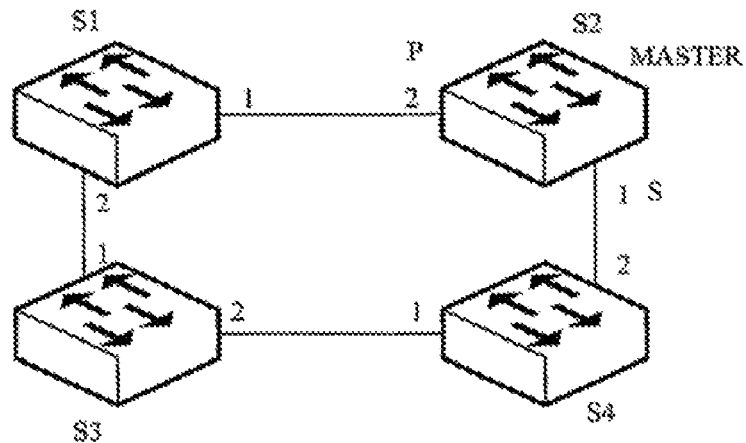
FIG. 1 is a topological graph of the Ethernet ring automatic protection system.
Figure 2:
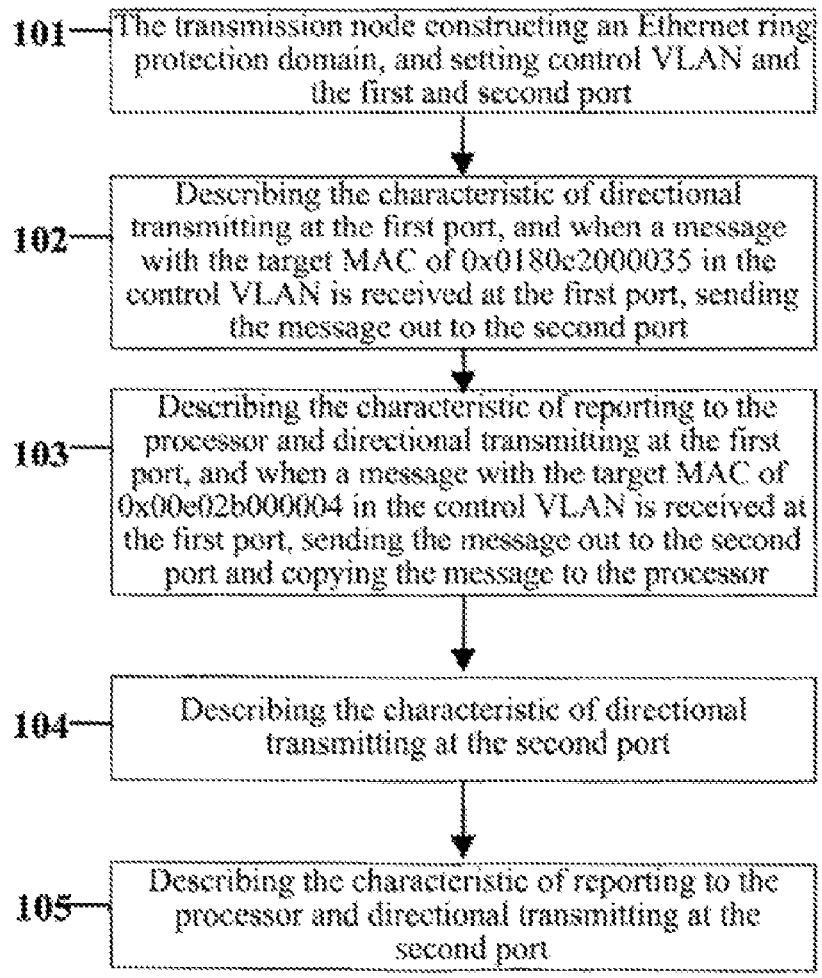
FIG. 2 is a flow chart of the implementation of the transit node in accordance with the method of the present embodiment.
Figure 3:
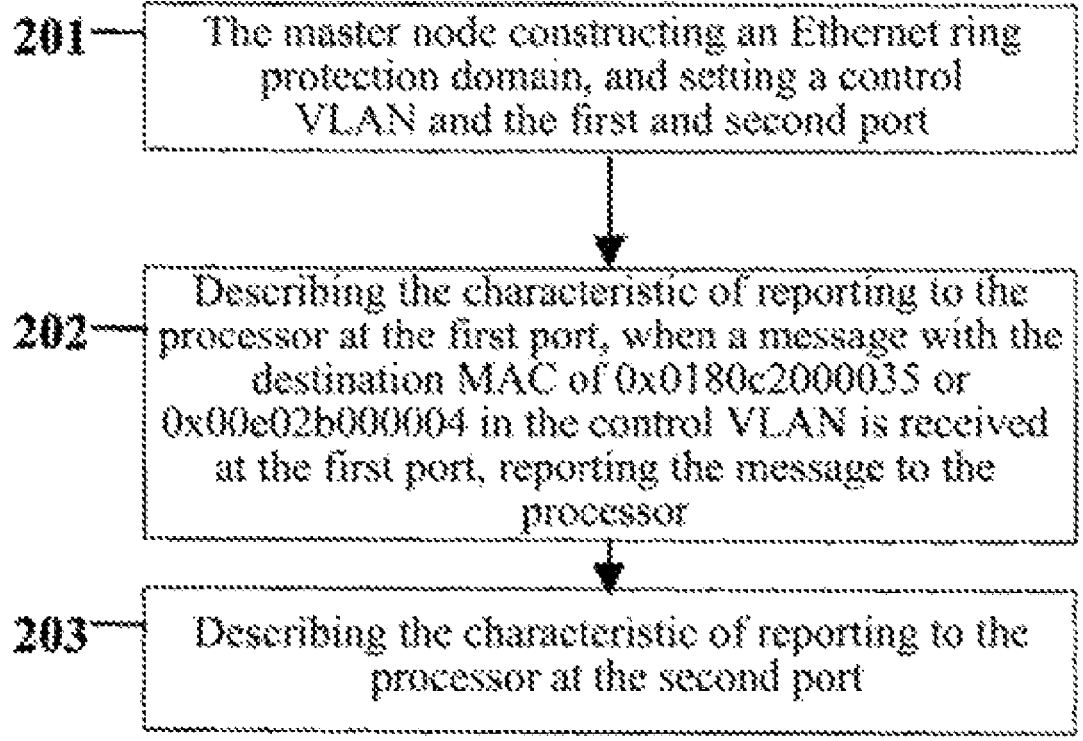
FIG. 3 is a flow chart of the implementation of the master node in accordance with the method of the present embodiment.

As shown in FIG. 1, the Ethernet ring automatic protection system comprises the master node and the transit nodes, wherein:

Said master node is used to send the HELLO message periodically and determine the link condition according to the return status of the HELLO message and the LINK-DOWN message from the transit node, and notify the link condition to the transit node. Said HELLO message carries the distinguishing ID which is used to determine whether the message need to be processed by the transit node or not;

Said transit node is used to send the LINK-DOWN message to the master node and receive the HELLO message from the master node, and perform one of the following processes for the message according to the distinguishing ID carried in the HELLO message: send said message to other nodes from the other port, send said message to the processor and send it to other nodes from the other port, and after the transit node receives the notification about the link condition from the master node, it determines whether to update the MAC address table thereof on the ring.

The difference between the master node and the transit nodes is that: the messages received by the master node should be sent to the master node's processor to process, while those received by the transit nodes might only to be forwarded or to be forwarded and sent to the transit nodes' processor to process as well.

The Ethernet ring control messages are sorted according to the destination MAC address, and the master node and transit nodes identify the messages automatically, thus sending the control messages need not to be sent to processor to the processor and occupying the system resource is avoided, and make the system efficient and reliable.

The method for processing the Ethernet ring control messages comprises: when a node (including the master node and the transit nodes) constructs a message to send, it carries the message's category ID for determining whether the message should be processed by the transit nodes; after the port of another node receives the message, it processes the message according to the category ID carried in the message, and if the node is the master node, it will sending the message to its processor, while if the node is a transit node, it will send the message to other node through the other port (directional transmission), or send the message to its processor and meanwhile send the message to other nodes through the other port.

In the implementation, the configuration for processing messages by an Ethernet ring transit node comprises:

S101, the transit node constructing an Ethernet ring protection domain, determining a control VLAN and two ports on the ring, which are a and b respectively;

S102, describing the characteristic of directional transmitting at port a, that is, when a message with the VLAN number equal to the control VLAN and the destination MAC of the message being 0x0180c2000035 is received at port a, sending the message out through the other port on the ring i.e. port b, and not sending the message to the processor of the transit node;

S103, describing the characteristic of sending to the processor and directional transmitting at port a, that is, when a message with its VLAN number equal to the control VLAN and its destination MAC being 0x00e02b000004, sending the message out through port b and copying the message to the processor of the transit node as well;

S104, describing the characteristic of directional transmitting at port b, that is, when a message with its VLAN number equal to the control VLAN and its destination MAC being 0x0180c2000035 is received at port b, sending the message out through port a, and copying the message to the processor of the transit node as well;

S105, describing the characteristic of sending to the processor and directional transmitting at port b, that is, when a message with its VLAN number equal to the control VLAN and its destination MAC being 0x00e02b000004 is received at port b, sending the message out through port a and copying the message to the processor of the transit node as well;

There is no order for S102~S105.

The configuration for processing message by the master node in the Ethernet ring comprises:

S201, the master node constructing an Ethernet ring protection domain, determining a control VLAN and two ports on the ring, which are c and d respectively;

S202, describing the characteristic of sending to the processor at port c, that is, when a message with its VLAN number equal to the control VLAN and its destination MAC being 0x0180c2000035 or 0x00e02b000004 is received at port c, sending the message to the processor and not sending it out through port d;

S203, describing the characteristic of sending to the processor at port d, that is, when a message with its VLAN number equal to the control VLAN and its destination MAC being 0x0180c2000035 or 0x00e02b000004 is received at port d, sending the message to the processor and not sending it out through part c;

There is no order for S202~S203.

The above method is applied in one Ethernet ring protection system. There are five transit nodes and one master node on the ring, and there are ten domains, the transmission period of the HELLO message is 100 ms, thus there are 100 HELLO messages transmitting per second on the ring. In the Ethernet ring protection system that does not apply the above method, the processor utilization percent of both the transit nodes and the master node is 30%, and during the link switch, their processor utilization percent is 40% and some messages are discarded, and the system might fail sometimes; After the system applies the method of the present invention, the processor utilization percent of the transit nodes is 7% and that of the master node is 30%, during the link switch, the processor utilization percent of the transit nodes is 10% while that of the master node is 40%, and there is no message discarded and there is no breakdown in link switch.

The method for processing the Ethernet ring control message offered in the present invention sorts and defines the destination MAC addresses of the control messages, and defines the characteristics of the methods for processing the messages to make each node process the control message in the most efficient way, thus greatly reduce the waste of the system resource and increase the reliability of the system.

The described above is only the preferred embodiments of the present invention, which is not intended to limit the present invention. For others skilled in the art, the present invention may have various modifications and variations, and any modifications, equal alternatives, improvement, and so on from the spirit and principle of the present invention should belong to the scope of the present invention.

For example, the definition of the categories of the control messages is not only according to the MAC address but also according to other ID. When defines according to the MAC address, it is not limited to the two MAC addresses of 0x0180c2000035 and 0x00e02b000004. These two addresses are used here to facilitate the implementation, making the hardware automatically identify which category that the Ethernet ring control message belongs to. However, other values other than these two can also be used.

For example, the Ethernet ring control messages described in the present invention also comprise the ask message which serves as that: a transmission node sends the ask frame to the master node to query the status of the current link during the initialization, and the ask message belongs to the category of sending to the processor in the master node while to the category of directional transmitting in the transit node.

What we claimed is:

1. A method for processing Ethernet ring control messages, comprising the following steps of:
   1.1) distinguishing a message to be processed by processors of transit nodes from a message not to be processed by the processors of the transit nodes with a distinguishing identification, and setting the distinguishing identification in a message when a master node or the transit nodes constitute the message to be sent;
   1.2) after receiving the message from one port, the transit node forwarding the message through other ports when determining the message does not need to be processed by the processor of the transit node according to the distinguishing identification of the message, reporting the message to the processor of the transit node as well as forwarding the message through other ports when determining the message needs to be processed by the processor of the transit node according to the distinguishing identification of the message.

2. A method of claim 1, wherein the processor is a Central Processing Unit (CPU), a network processor, or a field programmable gate array.

3. A method of claim 1, wherein said distinguishing identification is any one of a destination Media Access Control (MAC) address of the message, a Virtual Local Area Network (VLAN) number of a frame, and a code at a fixed position in the message.

4. A method of claim 3, wherein,
   if the destination MAC address of the message received by the transit node at one port is 0x0180c2000035, the transit node sends the message to other nodes from the other port;
   if the destination MAC address of the message received by the transit node at one port is 0x00e02b000004, the transit node reports the message to the processor thereof and sends the message to other nodes from the other port.

5. A method of claim 4, wherein in step 1.1), the master node sets the destination MAC address of a link failure notification message and a link recovery notification message as 0x00e02b000004.

6. A method of claim 1, further comprising:
   after receiving any one of the message, the master node reporting the message to the processor thereof.

7. An Ethernet ring automatic protection system, comprising a master node and transit nodes on a ring, wherein,
   The master node is configured to send a health detection message regularly, determine link status according to the return status of the health detection message and a failure alarm from The transit nodes, and notify the transit nodes of the link status, the health detection message carrying a distinguishing identification to be used to determine whether the message needs to be processed by the transit node;
   The transit node is configured to send the failure alarm to the master node, receive the health detection message from the master node, send the message to other nodes from the other port when determining the message does not need to be processed by the processor of the transit node according to the distinguishing identification, send the message to other nodes from the other port as well as report the message to a processor of the transit node when determining the message needs to be processed by the processor of the transit node according to the distinguishing identification, and determine whether to update a Media Access Control (MAC) address table thereof on the ring after receiving a link status notification from the master node.

8. A system of claim 7, wherein the processor is a Central Processing Unit (CPU), a network processor, or a field programmable gate array.

9. A system of claim 7, wherein the distinguishing identification is any one of a destination MAC address of the message, a Virtual Local Area Network (VLAN) number of a frame, and a code at a fixed position in the message.

10. A system of claim 9, wherein,
    if the destination MAC address of the message received by the transit node from one port is 0x0180c2000035, the transit node sends the message to other nodes from the other port;
    if the destination MAC address of the message received by the transit node is 0x00e02b000004, the transit node sends the message to the processor of the transit node and to other nodes from the other port.

11. A system of claim 10, wherein the master node sets the destination MAC address of the link failure notification message and a link recovery notification message as 0x00e02b000004.

12. A system of claim 7, wherein, after receiving the health detection message and a link failure alarm message, the master node reports the messages to a processor thereof for processing.

* * * * *

UNITED STATES PATENT AND TRADEMARK OFFICE
CERTIFICATE OF CORRECTION

PATENT NO. : 8,320,236 B2
APPLICATION NO. : 12/665702
DATED : November 27, 2012
INVENTOR(S) : Shaoyong Wu et al.

It is certified that error appears in the above-identified patent and that said Letters Patent is hereby corrected as shown below:

Column 8, Line 13, Claim 7:

After "failure alarm from"
Delete "The" and insert -- the --.

Signed and Sealed this
Nineteenth Day of March, 2013

Teresa Stanek Rea
*Acting Director of the United States Patent and Trademark Office*